United States Patent [19]
Menon

[11] Patent Number: 5,257,362
[45] Date of Patent: Oct. 26, 1993

[54] METHOD AND MEANS FOR ENSURING SINGLE PASS SMALL READ/WRITE ACCESS TO VARIABLE LENGTH RECORDS STORED ON SELECTED DASDS IN A DASD ARRAY

[75] Inventor: Jaishankar M. Menon, San Jose, Calif.

[73] Assignee: International Business Machines Corporation, Armonk, N.Y.

[21] Appl. No.: 666,289

[22] Filed: Mar. 8, 1991

[51] Int. Cl.$^5$ .............................................. G06F 11/10
[52] U.S. Cl. ................... 395/425; 371/51.1; 371/40.2; 364/DIG. 1; 364/254.9; 364/243.7; 364/248.1
[58] Field of Search ............. 395/400, 425, 575; 371/51.1, 40.1, 40.2, 70.1

[56] References Cited

U.S. PATENT DOCUMENTS

| | | | |
|---|---|---|---|
| 4,849,978 | 7/1989 | Dishon et al. | 371/51.1 |
| 4,914,656 | 4/1990 | Dunphy, Jr. et al. | 371/40.1 X |
| 5,077,736 | 12/1991 | Dunphy, Jr. et al. | 371/10.1 |
| 5,124,987 | 6/1992 | Milligan et al. | 371/10.1 |
| 5,134,619 | 7/1992 | Henson et al. | 371/11.1 X |
| 5,140,592 | 8/1992 | Idleman et al. | 371/9.1 X |
| 5,155,835 | 10/1992 | Belsan | 395/425 |
| 5,210,866 | 5/1993 | Milligan et al. | 371/10.1 |

OTHER PUBLICATIONS

Brady et al., "Method and Means for Accessing DASD Arrays with Tuned Data Transfer Rate and Concurrency", USSN: 07/528,999, Filed May 24, 1990.
Patterson et al., "A Case of Redundant Arrays of Inexpensive Disks (Raid)", ACM Sigmod Conference, Chicago, Ill., Jun. 1-3, 1988.

*Primary Examiner*—David L. Robertson
*Attorney, Agent, or Firm*—R. Bruce Brodie

[57] ABSTRACT

Write update of variable length records stored in row major order on an array of N DASDs is facilitated by utilizing the correlation between byte offsets of a variable length record and the byte offset of a byte level parity image of data stored on the same track across N−1 other DASDs.

6 Claims, 4 Drawing Sheets

Array with Single Parity Track

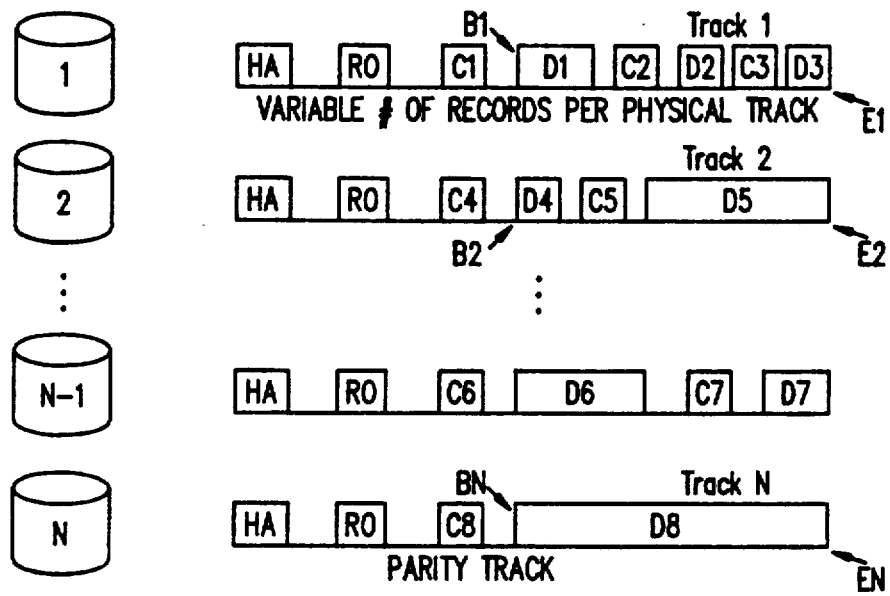
FIG. 5 — Array with Single Parity Track
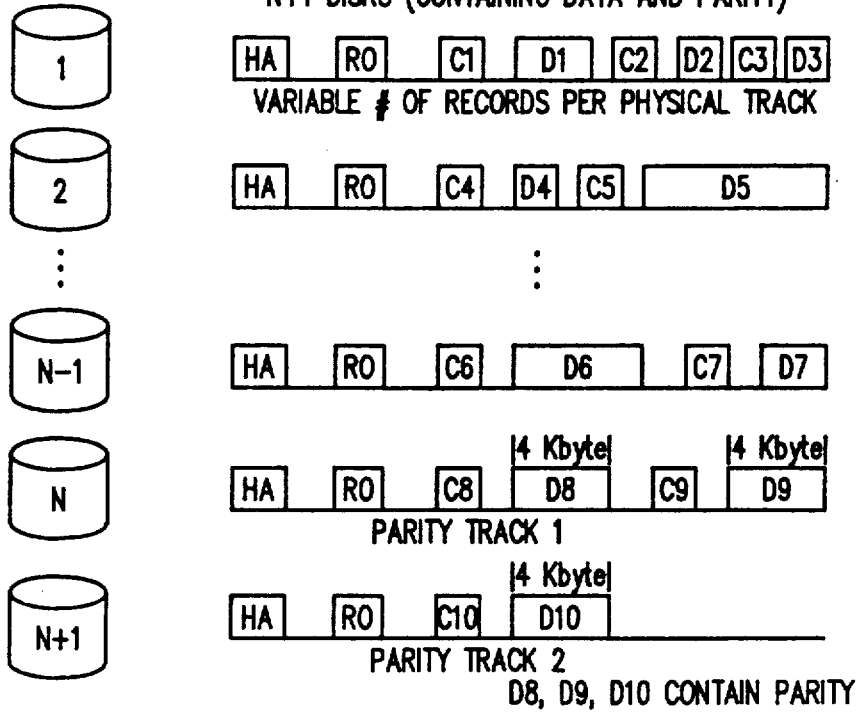
FIG. 6 — Array with Two Parity Tracks

METHOD AND MEANS FOR ENSURING SINGLE PASS SMALL READ/WRITE ACCESS TO VARIABLE LENGTH RECORDS STORED ON SELECTED DASDS IN A DASD ARRAY

FIELD OF THE INVENTION

This invention relates to methods and means for accessing arrays of direct access storage devices (DASDs) where data is stored in variable length format (CKD) and where many of the transfers are small or bursts. Small transfers (read/write operations) occur when less than all the array DASDs in an otherwise synchronous transfer group are accessed.

DESCRIPTION OF RELATED ART

Tuning DASD Array Data Rate and Concurrency With Respect to Fixed Length Records and the Like The copending Brady et al patent application, U.S. Ser. No.: 07/528,999, filed May 24, 1990 (SA9-89-028) described a method and means for accessing an array of N synchronous DASDs storing blocked data (data in the form of fixed equal length extents). The array appeared to the accessing CPU as a virtual DASD in which each track length was N*single DASD physical track length. The data rate was equal to (N−1)*single device rate. The model assumed that a single DASD (parity DASD or equivalent space) would facilitate data regeneration given a single DASD failure.

Brady et al discovered that a single parameter relating to the repetition pattern of storing the fixed blocks on the physical array could be used to "tune" both data rate and concurrency (number of independent concurrent accesses).

The CPU/array data rate was maximized by accessing N blocks at a time from N counterpart physical tracks of N DASDs, the accessed blocks forming part of a logical record of K*N consecutive fixed blocks with repetition intervals 1 to N, (N+1) to 2N, (2N+1) to 3N, . . . {(K−1)N+1} to KN. Each physical track had a capacity of up to K blocks. This laying across of N blocks at a time was termed "array column major order" with a repetition internal of N. Of course only one transaction at a time could be served since all N DASDs were being accessed by the same process.

Concurrency was improved when consecutive blocks were laid out along a track of counterpart b<N DASDs, the repetition interval being K blocks. That is, the first track of the first DASD would store blocks 1 to K. A counterpart track of the second DASD would store blocks K+1 to 2K. The counterpart track of the bth DASD would store blocks (b−1)K+1 to bK. The laying out of blocks in the track direction was termed "array row major order". Consequently, the array could be partitioned into two groups of b and N-b DASDs respectively. Each group could be independently and concurrently accessed.

Brady et al's solution involved (a) formatting the blocks onto the array using a row major order modulus and (b) executing the random sequences of large and small access requests over the array.

More comprehensively stated, Brady's method included (a) formatting the K*N blocks of a logical file onto the array in row major order modulo M and in column major order modulo M*N, M lying in the closed interval (1,K); and (b) executing large and small access requests over the N DASD array whereby the minimum number X of blocks transferred to achieve the maximum data rate for a given M lies in the closed interval ((N−1, (N−1)K), the end points of the latter interval being defined by M=1 and M=K respectively.

Numerically Intensive Computing, Transaction Processing, and Long and Short Reads and Writes As those skilled in the art readily appreciate, Brady et al method clearly equated high data rate with numerically intensive computing (NIC). It further equated concurrency with transaction processing.

In NIC, a CPU sequentially accesses and processes large messages formed from long strings of alphanumerics from fast access, high capacity, intermediate result storage i.e. DASD arrays. Also, CPU's frequently use iterative rather than recursive algorithms. While both algorithm types may execute repeated sequential referencing and re-referencing of the same or similar strings of partial results, iterative based computations are less prone to data access errors propagating through the entire computation. Thus, access error might very well be ignored as a matter of system or application choice rather than interrupting or repeating a lengthy and involved CPU/array exchange. Another approach outside of this discussion might be the use of block rather than cyclic error codes. Under this circumstance, the CPU would have to rebuild only the affected data block.

Transactions are characterized by random storage referencing and atomic operations to ensure data integrity and recoverability. Such processing typically involves an interactive man/machine exchange of small/short messages occurring at an automatic bank teller machine, a supermarket checkout counter or the like. It is the sheer volume of such individually processed single thread computations that imposes a concurrency of access requirement on intermediate result storage (DASD array). That is, the need to process as many transactions as possible about the same time.

Aspects of Accessing Variable Length Data from a DASD Array

A significant fraction of data reposes on DASD storage in variable length format. One regimen, which is used on IBM S/370 CPU's and attached external storage, is known as Count/Key/Data or CKD operating under the well known MVS operating system. In this regimen, each record consists of fixed length count and key fields and a variable length data field. The count field defines the length of the data field while the key field serves as a record ID. The fields, as recorded on DASD, are separated on the track by a space or gap which defines a time interval during which the system prepares to handle the next field.

A record having a data field spanning more than a physical DASD track is reformatted at the CPU into several smaller records with appropriate pointers or other linking conventions maintained somewhere in the storage or file management portions of the operating system. Likewise, a track may store many small records of various lengths. This leads to the fact that reading, writing, and updating variable length records on files result in a more complex operation than that involving fixed blocks.

Write Updating and Parity

Patterson et al, "A Case for Redundant Arrays of Inexpensive Disks (RAID)", ACM SIGMOD Conference, Chicago, Ill., Jun. 1-3, 1988 discussed logical record to physical track mapping. He also mentioned storing blocks onto a DASD array in column major order avoiding both mirrored DASDs and Hamming ECC encoding. This was in order have a data rate accommodating both small and large access requests. Lastly, Patterson describes the calculation of new parity as the XOR'ing of old data, new data, and old parity. The latter was significant because it indicated that it was not necessary to access N DASDs if all that was required was the updating of one block on one of the DASD. As pointed out in Brady et al, only the affected data and parity DASD containing the information of interest need be accessed.

Concurrency and Single Pass Has Several Implications

Clearly, two partitions of b and N-b DASDs can be concurrently accessed by respective applications. However, because the arms of the DASDs within a partition may be differently positioned on the data and parity tracks, there is no concurrency, or more properly, synchronism of the elements in positioning, reading, or writing.

The term "single pass" as used in this specification means an interval during which all the operations necessary to effectuate a given end effect or result are performed. The term does not connote a single DASD track revolution.

SUMMARY OF THE INVENTION

It is accordingly an object of this invention to devise a method and means for for ensuring single pass access to a selected DASD in an array of N DASDs especially suited for small track read and write operations and where data is recorded in variable length format.

The foregoing object is satisfied by a method and means utilizing the correlation between byte offsets of a variable length record and the byte offset of a byte level parity image of data stored on the same track across N−1 other DASDs.

The method of the invention write updates selected fields among variable length formatted (count, key, and data) records stored in row major order on DASD tracks of an array of N DASDs. The method and means comprising the steps/elements of generating a byte level exclusive OR simple parity image of the records as physically recorded from each ith track across N−1 DASDs and storing said image as a variable length record on an ith track of the Nth DASD.

The method further comprises the step, responsive to each write request to a selected DASD, of (1) establishing byte position offset synchrony of the record to be updated on the ith track of the selected DASD and the record identity within the parity record on the ith track of the Nth DASD, (2) obtaining and updating said records from the selected DASD and from the Nth DASD; and (3) rewriting the updated data and parity records back to ith track on the selected and Nth DASDs respectively.

Restated, the write update in a single pass is obtained by altering and rewriting the parity concurrent with altering and rewriting the data. That is, both data and relevant parity are accessed in terms of byte offsets in an equivalent virtual DASD. Then, the data and parity are recalculated and rewritten on the selected and Nth DASD in synchronized fashion respectively.

The parity images are distributed across different DASDs such that there is no "parity DASD" as such. For instance, for an array of N=10 DASDs, the image of the ith track from DASDs 1-9 would be stored on DASD 10 while the image of the ith+1 track over DASDs 2-10 would be stored on DASD 1.

Also, full track read of parity image may be avoided where the image is stored over two instead of a single image track.

BRIEF DESCRIPTION OF THE DRAWING

FIG. 5 sets forth a variable length record layout across the DASD array using full track record on parity track according to the invention.

FIG. 6 further sets forth a variable record layout using two parity tracks according to the invention.

DESCRIPTION OF THE PREFERRED EMBODIMENT

Logical and Physical Aspects of A DASD Array

Figure 1:
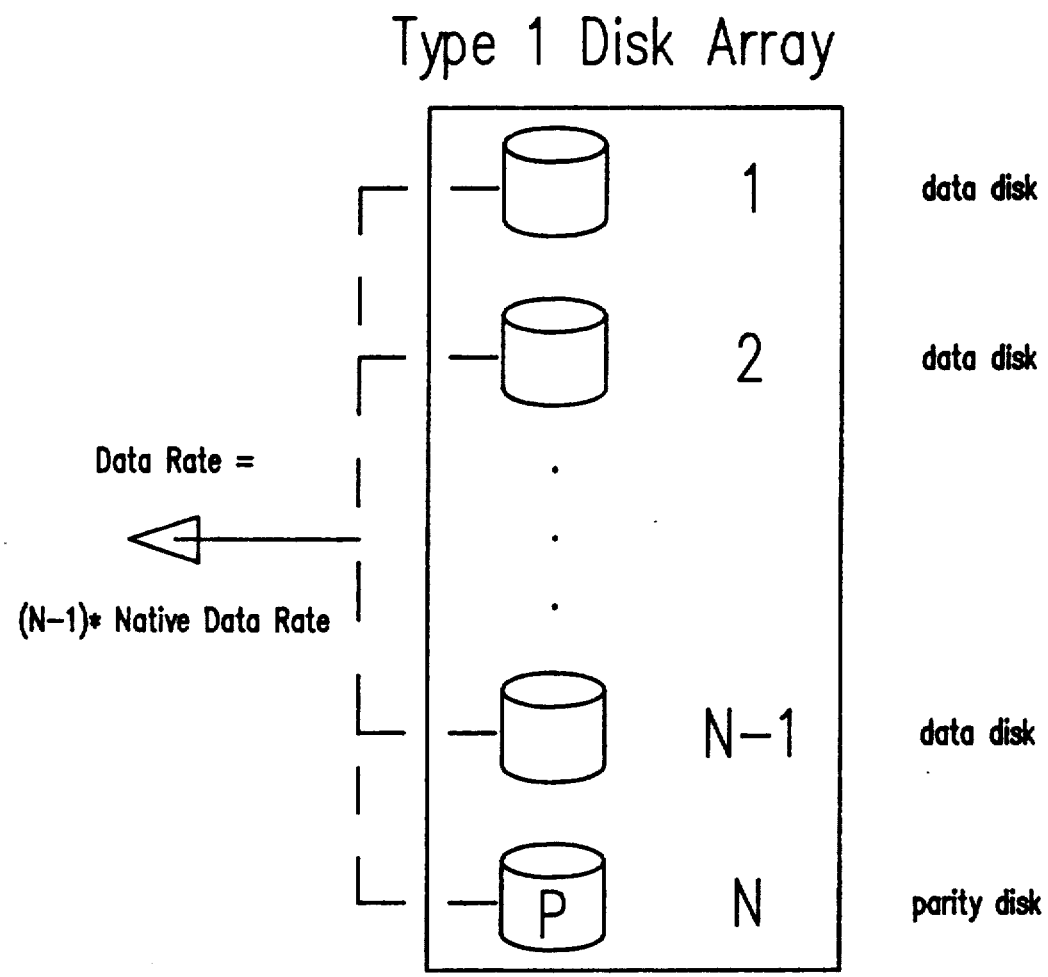
FIG. 1 conceptually depicts a synchronous array of N DASDs according to the prior art.

Referring now to FIG. 1, there is depicted a synchronous array of N DASDs according to the prior art. In this array, the blocks of a recorded are written in column major order with the Nth DASD always containing the parity block in the manner of the copending Brady et al application. Advantageously, the data rate is increased N−1 times the transfer rate of a single DASD and has found use where large read/writes were involved.

Figure 2:
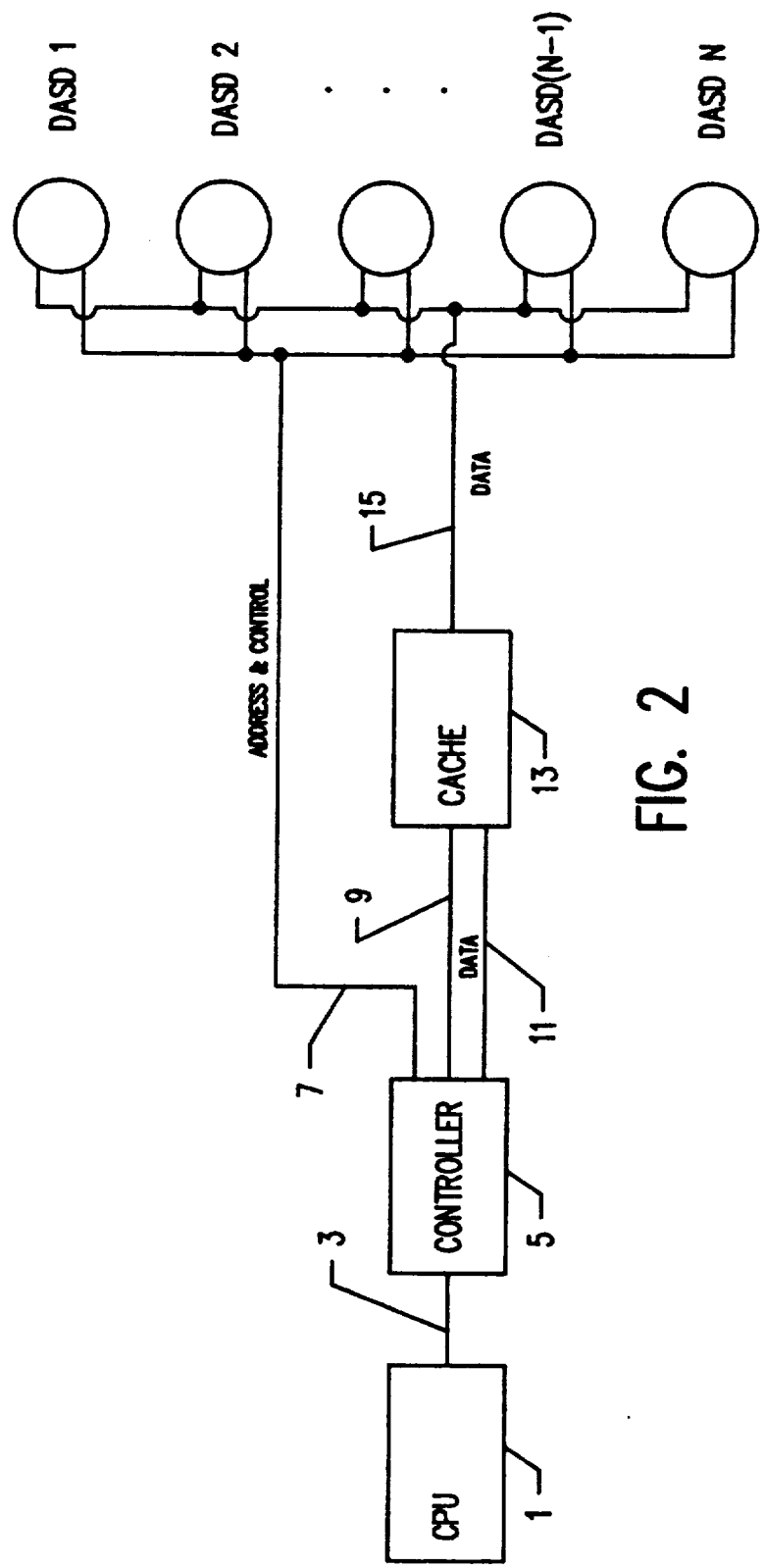
FIG. 2 illustrates a prior art DASD array attached to a CPU using a cache and a controller in the data path.

Referring now to FIG. 2, there is shown CPU 1 accessing DASD 1 through N over a path including channel 3 array controller 5 and cache 13. Controller 5 operatively secures synchronism and accesses among DASD 1 through N over control path 7. Responsive to an access, N bytes of data can be exchanged in parallel to cache 13 over data path 15. Likewise, data can be exchanged serially by byte between CPU 1 and cache 13 over control and data paths 9 and 11 via the controller 5 and path 3.

Prior Art Fixed Block Formatting in Column and Row Major Order

Placement of a cache 13 in the array alters the view of storage as seen by CPU 1. This caches smooths and facilitates any application running on CPU 1 accessing information in a block organized logical DASD having one or more logical tracks organized into logical cylinders. The smoothing derives from the cache operating as a specialized buffer decoupling the cache/array interaction from the CPU/cache interface. That is, it reduces the data rate differences since cache reference rate to the DASD array should be significantly less than the CPU reference rate to the cache for at least random (non-sequential) accesses.

Figure 3:
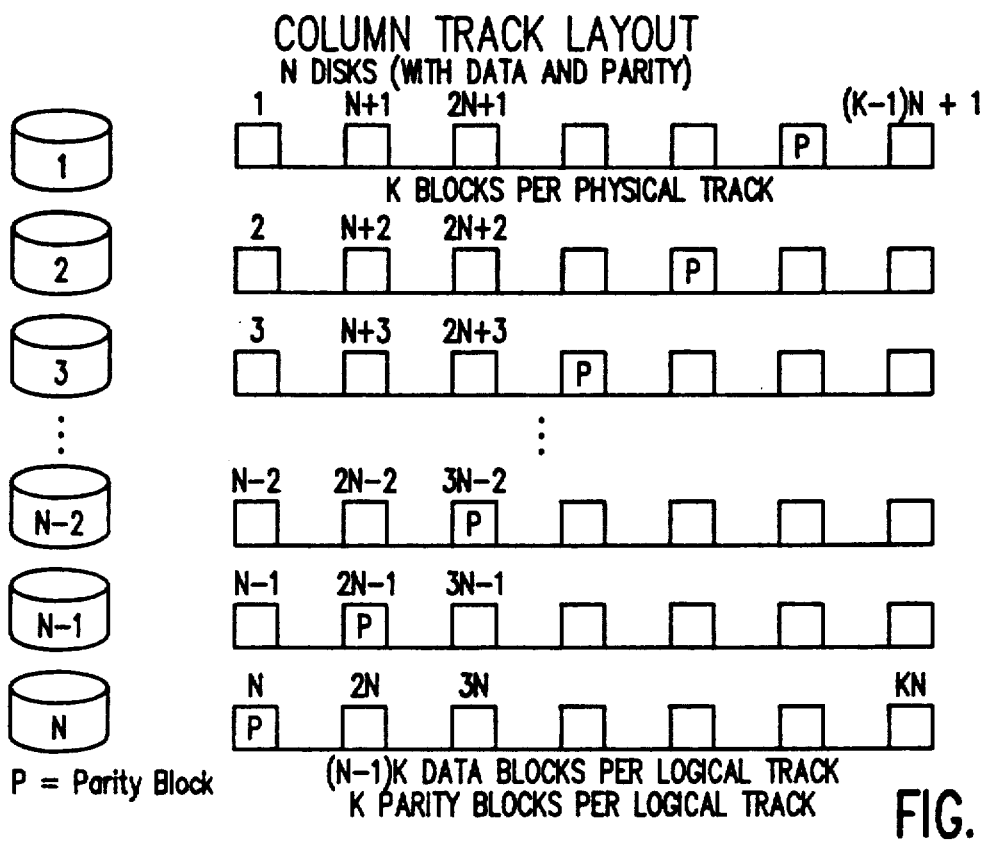
FIGS. 3 and 4 show prior art fixed block layout in respective DASD array column and row major order.

Referring now to FIG. 3, KN blocks are formatted in column major order. Also, each parity blocks spans the N−1 other blocks in its column. However, the K parity blocks are diagonally striped across the DASD. In the event of concurrent write operations, the diagonal striping avoids making any one DASD contentious as would be the case if all parity blocks were on a parity DASD.

Where K>>N, then the striping would occur K modulo N. Furthermore as mentioned above, current read and write of different blocks in the same column (since they are located on different DASD) is possible. Notwithstanding, concurrent writes to blocks in the same column or to blocks on the same DASD are to be avoided. In the first case, the same parity block can only be changed serially while in the second case the same DASD can only be written or read in serial order.

Figure 4:
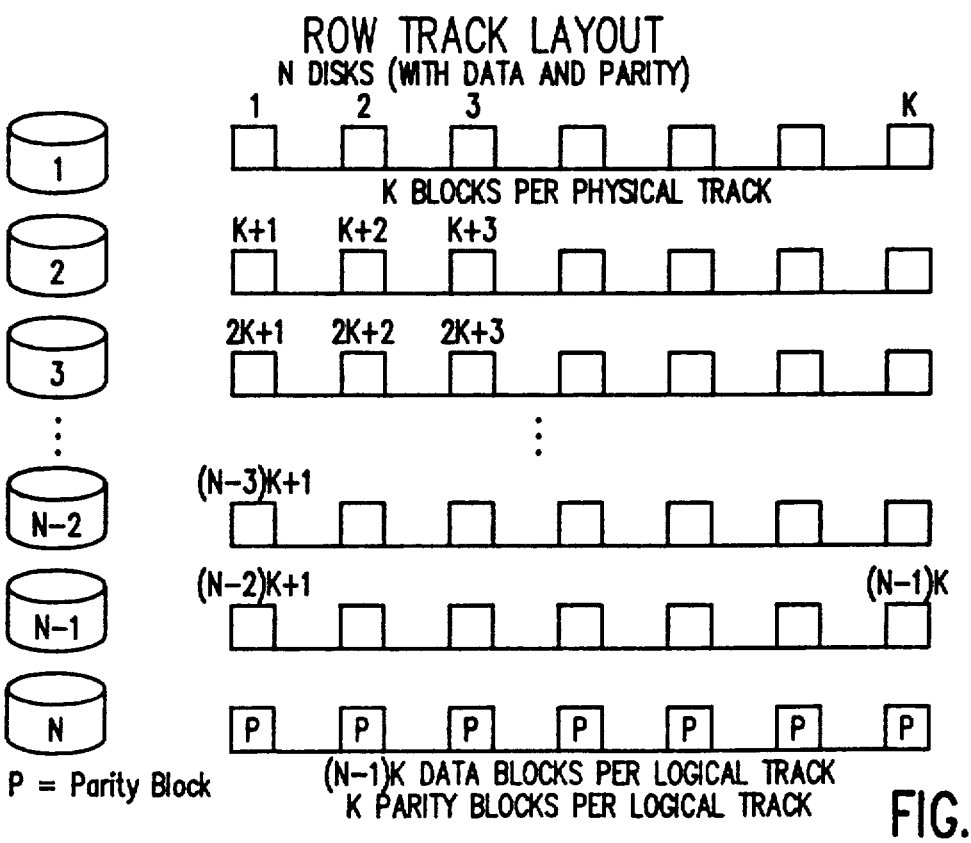

Referring now to FIG. 4, there is shown the mapping of KN blocks of a logical track onto an array of N DASDs of the type 2 H in row major order K modulo M where M=K and a row of K parity blocks on the Nth DASD spanning counterpart column blocks.

The array shown FIG. 4 has N DASDs, K blocks per physical track, and NK blocks per logical track. However, unlike the column major order layout order of type 2 V array, the KN consecutive blocks of the logical track in FIG. 4 are stored in row major order along a counterpart physical DASD track. Also, that the parity blocks in the 2 H array is different form the 2 V array. For the KN blocks of the group or logical track shown in the FIG. 4, the K parity blocks are stored on the physical track of DASD N. Then, for the KN blocks of a second group or logical track (not shown in FIG. 4), the K parity blocks would be stored on a predetermined track on DASD N−1. Similarly, the KN blocks of a third group or logical track would have their K parity blocks stored on DASD N−2 and so on.

Variable Block Formatting in Row Major Order and Write Updating Using A Single Parity Track According to the Invention With fixed block sizes, it becomes easy to create and store parity blocks. When records on the different physical tracks are all of different sizes, it is not clear how the data on the parity track is to be stored, since the records on the different tracks do not all line up. The method of invention facilitates the storage and access of variable length blocks in the DASD array.

Referring now to FIG. 5, there is shown a variable length CKD formatted records. The layout shown more closely resembles the row major rater than the column major order. That is, consecutive records are stored along a physical track. Unlike the constant block size case however, the number of records in a physical track is a variable number and is not fixed at K.

In formatting DASD disk tracks using the CKD convention, each physical track includes the well-known Home Address (HA) and Record Zero (R0) fields, followed by some number of CKD records. For the logical track shown in FIG. 5, all the parity is stored on the physical track of DASD N. For the next logical track, all the parity is stored in DASD N−1, and so on. Significantly, parity is spread among all the DASDs, and there is no one single parity DASD. This scheme is very similar to that for row track layout.

Referring again to FIG. 5, any description of the data stored in the parity track on the Nth DASD should cover the case where individual physical tracks may have defects in different locations. However, the FIG. 5 layout assumes that there are no defects on any of the physical tracks making up the logical track under consideration.

Consider, the first two fields on the parity track are the standard HA and R0. They contain information regarding the physical address of the track, and the position of defects in it, and are generated in the normal manner (and not as the parity of HA and R0 from the other N−1 tracks). Following the HA and R0, there is a single full-track record consisting of a count field (C8) and a data field (D8).

A count field on a CKD track contains physical information (physical address, defect pointers, etc.) and logical information (five bytes in the format CCHHR, that is, two bytes of cylinder number, two bytes of head number and one byte of record number).

The physical information part of the count field (C8) of the parity track contains the obvious values. The five bytes of logical information in the count field of the parity track (CCHHR) is defined as equal to the parity (XOR) of the five bytes of CCHHR from the count fields of the first record after R0 from all the other N−1 tracks. This completely defines the contents of C8. Next, the contents of the data field (D8) of the parity track are defined.

In this specification, the notation "$<=$" means "less than or equal to". That is, it defines a closed or bounded number interval. Also, the acronym ECC, stands for any type of "error correction code" ordinarily and usually appended to a record. Among error correction codes of the block type are Hamming codes and BCH codes.

For $1<=i<=N$, let B(i) represent the byte position corresponding to the location where the first data field after R0 begins on track i (DASD i). All the byte positions, B(i)'s would be identical if there are no defects in any of the N physical tracks. However, the presence of defects will make B(i) vary with i.

Let E(i) be the byte position corresponding to where the last byte of data on a particular physical track may be stored, $1<=i<=N$. Note, if there are no defects on a track, E(i) is several bytes from the end of the physical track. If a track has its full complement of defects, then E(i) is ECC bytes before the last byte on the track, where ECC is the number of bytes needed to store the ECC on the data field.

It is important to remember that, for $1<=i<=N$, the number of bytes between B(i) and E(i), not including defects, is the same. If X is the number of bytes, then D8 is X bytes long.

Now, byte B(i) on the parity track is the exclusive OR of byte B(i) from all the other N−1 tracks. Also, byte B(i)+1 is the exclusive OR of byte B(i)+1 from all other N−1 tracks. In this way, X bytes in the data field of the parity track can be generated, by doing a byte by byte exclusive OR of every non-defective byte from B(i) to E(i), for $1<=i<=N$. A byte position that falls in the gap between fields on any of the physical tracks or a byte position that is part of an ECC field is assumed to be a byte of zeros for the purpose of generating parity.

To illustrate the method of the invention and referring still again to FIG. 5, suppose it is desired to update D3 on DASD 1 and where D3 be five bytes long. Consequently, D3 is read from DASD 1 and D8 is read from DASD N. Field D8 is updated by changing the value of the last five bytes in D8. Significantly, this is determined through the exclusive OR'ing of the old and new values of D3 and the old value of the last five bytes of D8. This updated value of D8, and the new value of D3 are then written back to DASD.

Data Reconstruction Using the Method of the Invention

When a physical track on a failed DASD disk needs to be recreated, the corresponding physical track from the surviving N−1 DASDs is copied into N−1 full-track buffers. Each physical track of data that is read is stored in its corresponding buffer, with every field on the track separated by gaps as they would be on the physical track. Zeros are stored in the buffer where gaps exist between fields (ECC is considered as part of the gap). It is important to store each of the N−1 physical tracks in the buffers with gaps between fields (rather than with all the fields adjacent to each other), because this causes all the data in the N−1 buffers to be properly aligned for a byte-by-byte recreation of the missing track to be generated.

Write Updating Using Two Parity Tracks According to the Invention

One limitation of a single track byte level simple parity image for each group of N−1 counterpart data tracks as used with variable-length records is that small writes will force full-track reads and writes of the parity track. In contrast, fixed block systems avoid such a requirement because only the relevant parity block need be read rather than the entire parity track.

Referring now to FIG. 6, there is depicted another variation of the method of this invention. In this variation, all the information (X bytes) stored in the large data field D8 is partitioned and stored as records of equal size (say 4K bytes). For example, if X, the size of D8, was 12 Kbytes, then store those 12 Kbytes in three 4 Kbyte records. If the information stored in D8 is stored as 4K records instead of as a single, large record, it is clear that all the information in D8 will not fit into a single parity track (because of the gaps and count fields between the 4K records). Instead, two parity tracks would be used to store all the X bytes contained in D8 in 4K records. Fields D8, D9 and D10 shown in FIG. 6 contain the same bytes that were stored in field D8 shown in FIG. 5.

Referring now to FIG. 2, it is apparent that with this variation using two parity tracks per logical track, controller 5 would have to ascertain which one of the multiple 4K record fields from the parity tracks need to be read and written when executing small writes. Then, it would access only these relevant 4K records from the parity tracks, and full-track reads and writes of the parity track are no longer required. Thus, updating D3 would only require that data fields D3 and D10 be read and written back.

Extensions

These and other extensions of the invention may be made without departing from the spirit and scope thereof as recited in the appended claims.

I claim:

1. In a system comprising an array of N DASDs for storing records in row major order on counterpart tracks of N−1 of said DASDs and for storing a parity image of the counterpart tracks on the Nth DASD of said array, and a control unit responsive to externally supplied read or write requests for accessing records on said array,
   a method for write updating selected ones among a set of variable length records sorted on DASD tracks, each record including at least a count field and a variable length data field, the fields within a record and between records on each DASD track being spaced apart by a predetermined track extent termed a "gap", any arbitrarily addressable DASD track being denominated as an "ith track", comprising the steps by said control unit of:
   (a) generating a byte level exclusive OR simple parity image of the fields and gaps included within each of the variable length records from each counterpart ith track across N−1 DASDs, and, storing said image on an ith track of the Nth DASD, each gap being coded as an arbitrary constant value (000); and
   (b) responsive to each write request to a record stored on a selected DASD,
      (1) establishing a byte position offset of the record to be modified on the ith track of the selected DASD and the record identify within the parity image on the ith track of the Nth DASD,
      (2) obtaining and modifying said record from the ith track of the selected DASD and parity from the ith track of the Nth DASD, said parity being modified as the exclusive OR image of the old record, the record modification, and the old parity; and
      (3) rewriting said modified record and parity back to the ith track on the selected and Nth DASDs respectively.

2. The method according to claim 1, wherein step (a) further includes the steps of generating r byte level simple parity images in one-to-one relation to r groups of variable length records stored in counterpart tracks, each group of the r groups of records having a simple parity image stored on an ith track of a first DASD and variable length records on the ith tracks of (N−1) other counterpart DASDs; and storing each generated byte level simple parity image such that:
   (1) for r greater than N, each DASD stores at least one simple parity image track and at least one DASD stores two simple parity image tracks; and
   (2) for r less than or equal to N, no two simple parity images formed from two dissimilar groups of variable length records are stored on the same DASD, each group being stored on respective ith and jth tracks of combinatorially distinctive groups of N−1 DASDs.

3. The method according to claim 1, wherein said control unit further includes means for ascertaining a failed array DASD, and a plurality of full track buffers, and in the event one of the array DASD fails, said method further comprises the step of
   (c) recreating the variable length records stored on the ith track of any failed DASD by:
      (1) copying the variable length records from each of the N−1 non-failed DASDs into N−1 of the plurality of full track buffers in said control unit in which the relative position of each gap separated field is preserved by a predetermined Boolean value string inserted there between, thus retaining field alignment among tracks; and
      (2) forming an image of the records on the ith track of the failed DASD and their track position relationship by byte level XOR'ING the contents of the N−1 full track buffers.

4. The method according to claim 1, wherein step (a) still further includes the steps of blocking and storing a simple parity image (FIG. 6, DASDs N & N+1) over two tracks on the Nth DASD so as to minimize track latency.

5. In a system comprising an array of N DASDs for storing records in row major order on counterpart tracks of N−1 of said DASDs and for storing a parity image of the counterpart tracks on the Nth DASD of said array, and a control unit responsive to externally supplied read or write requests for accessing records designated in said requests,
   a method for ensuring single pass access to a selected ones of the DASDs especially suited for small track read and write access of variable length records, each record including at least a count field and a variable length data field, the fields within a record and between records on each DASD track being spaced apart by a predetermined track extent termed a "gap", any arbitrarily addressable DASD track being denominated as the "ith track", comprising the steps by said control unit of:

(a) creating a virtual image as a byte organized result of an exclusive OR operation upon counterpart bytes on the counterpart tracks across N−1 DASDs, and mapping the virtual image into at least one variable length formatted record on the Nth DASD, said counterpart bytes on the counterpart tracks include the fields and gaps within each of the variable length records, each gap being coded as an arbitrary constant value (000); and (b) responsive to a write request on accessing a record on the ith track on a selected on of the N−1 DASDs,
  (1) ascertaining the byte offset of the record to be updated on the ith track of the selected DASD and the record identify and byte offsets within the parity image on the ith track of the Nth DASD;
  (1) obtaining and modifying said record from the ith track of the selected DASD and the parity from ith track of the Nth DASD, said parity being modified as the exclusive OR image of the old record, the record modification, and the old parity; and
  (3) rewriting said modified record and parity back to ith track on the Nth and selected DASD respectively.

6. The method according to claim 5, wherein said control unit further including means for ascertaining a failed array DASD, and a plurality of full track buffers, and wherein said method further comprises the step of:

(c) in the event one of the array DASD fails, recreating the variable length records stored on the ith track of the failed DASD by:
  (1) copying the variable length records form each of the surviving N−1 DASDs into N−1 of the plurality of full track buffers in said control unit in which the relative position of each gap separated field is preserved by a predetermined Boolean value string inserted there between, thus retaining field alignment among tracks; and
  (2) forming an image of the records on the ith track of teh failed DASD and their track position relationship by XOR'ING the contents of the N−1 full track buffers.

* * * * *

UNITED STATES PATENT AND TRADEMARK OFFICE
CERTIFICATE OF CORRECTION

Page 1 of 2

PATENT NO. : 5,257,362
DATED : October 26, 1993
INVENTOR(S) : J.M. Menon

It is certified that error appears in the above-indentified patent and that said Letters Patent is hereby corrected as shown below:

```
Column 1, line 18, after "Like", insert -- blank line --.
Column 2, line 3,  after "respectively", insert -- blank line --.
Column 2, line 5,  after "Writes", insert -- blank line --.
Column 2, line 38, after "time", insert -- blank line --.
Column 2, line 40, after "Array", insert -- blank line --.
Column 2, line 62, after "blocks"., insert -- blank line --.
Column 2, line 63, after "Parity", insert --blank line --.
Column 3, line 11, after "accessed", insert -- blank line --.
Column 3, line 12, after "Implications",  insert -- blank line --.
COlumn 4, line 40, after "3", insert -- blank line --.
Column 4, line 42, after "order", insert -- blank line --.
Column 5, line 22, after "on", insert -- blank line --.
Column 5, line 25, after "Invention", insert -- blank line --.
Column 6, line 57, after "DASD", insert -- blank line --.
Column6, line 59, after "-tion", insert -- blank line --.
Column 7, line 5, after "generated", insert -- blank line --.
Column 7,line 7, after "Invention", insert -- blank line --.
```

UNITED STATES PATENT AND TRADEMARK OFFICE
CERTIFICATE OF CORRECTION

PATENT NO. : 5,257,362

DATED : October 26, 1993

INVENTOR(S) : J. M. Menon

It is certified that error appears in the above-indentified patent and that said Letters Patent is hereby corrected as shown below:

Column 10, line 21, delete "teh", insert --the--.

Signed and Sealed this

Thirtieth Day of August, 1994

Attest:

BRUCE LEHMAN

*Attesting Officer*  *Commissioner of Patents and Trademarks*